(12) United States Patent
Gunlogson et al.

(10) Patent No.: US 7,152,811 B2
(45) Date of Patent: Dec. 26, 2006

(54) HYDRAULIC BOOM STABILIZATION DEVICE

(75) Inventors: Matthew W. Gunlogson, Benson, MN (US); Aaron Robert Tollefsrud, Sunburg, MN (US)

(73) Assignee: CNH America LLC, Racine, WI (US)

( * ) Notice: Subject to any disclaimer, the term of this patent is extended or adjusted under 35 U.S.C. 154(b) by 225 days.

(21) Appl. No.: 11/020,589

(22) Filed: Dec. 22, 2004

(65) Prior Publication Data

US 2006/0175440 A1    Aug. 10, 2006

(51) Int. Cl.
- B05B 1/20 (2006.01)
- B05B 3/02 (2006.01)
- B05B 3/00 (2006.01)
- B05B 3/18 (2006.01)

(52) U.S. Cl. .................. 239/159; 239/726; 239/160; 239/161; 239/728

(58) Field of Classification Search .............. 239/159, 239/726, 728, 731, 733, 160, 161
See application file for complete search history.

(56) References Cited

U.S. PATENT DOCUMENTS

| | | | |
|---|---|---|---|
| 3,544,009 A | 12/1970 | Schlueter | |
| 4,288,034 A | 9/1981 | Widmer | |
| 5,887,390 A | 3/1999 | Schulz | |
| 5,988,528 A | 11/1999 | Krohn | |
| 6,012,648 A | 1/2000 | Morris | |
| 6,053,419 A | 4/2000 | Krohn | |
| 6,293,475 B1 | 9/2001 | Sobolik | |
| 2003/0052188 A1 | 3/2003 | Maliteare | |

*Primary Examiner*—Davis Hwu
(74) *Attorney, Agent, or Firm*—Rebecca Henkel

(57) ABSTRACT

A boom assembly includes a frame, a boom, a boom stabilization cylinder, and a feedback cylinder. The boom is rotatably mounted to the frame to rotate about a first axis. The boom stabilization cylinder is coupled to the boom to resist rotational deflection of the boom about the first axis. The feedback cylinder is coupled to a counterbalancing weight. The feedback cylinder is hydraulically coupled to the boom stabilization cylinder. Movement of the boom stabilization cylinder to resist deflection of the boom causes corresponding movement of the feedback cylinder to lift the counterbalancing weight.

17 Claims, 5 Drawing Sheets

HYDRAULIC BOOM STABILIZATION DEVICE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates generally to the field of agricultural sprayers employing one or more extendable booms, and more particularly, to the hydraulic stabilization of the boom(s).

An agricultural sprayer typically employs one or more booms to extend the spraying area of the vehicle. Typically, such booms are rotatable and/or foldable to reduce the size of the sprayer when not in use. The booms are typically supported by a frame structure that is mounted to a self-propelled vehicle, which also carries a tank that stores material to be applied to the coverage area and a pump for providing the material to spray nozzles mounted along the length of the booms. Typical booms are subjected to a wide variety of forces during operation due to the wide extent of the boom as well as other factors.

Typical forces are applied to the boom during vehicle acceleration, braking, turns and changes in direction. Other forces may be applied when a hill, rocks, or other obstructions are encountered. When a force is applied to the boom, the boom moves to accommodate the force without excessive wear and tear on the boom or boom frame. However, excessive boom movement can be detrimental to the product application, and may lead to structural damage.

The present invention is directed to overcoming, or at least reducing the effects of, one or more of the problems set forth above.

BRIEF SUMMARY OF THE INVENTION

The present inventors have recognized that a system for stabilizing a boom may be implemented by hydraulically coupling a boom stabilization cylinder to a feedback cylinder associated with a counterbalancing weight. The feedback cylinder provides a feedback force that urges the boom back to its equilibrium position while reducing overshoot and oscillation in the boom.

One aspect of the present invention is seen in a boom assembly including a frame, a boom, a boom stabilization cylinder, and a feedback cylinder. The boom is rotatably mounted to the frame to rotate about a first axis. The boom stabilization cylinder is coupled to the boom to resist rotational deflection of the boom about the first axis. The feedback cylinder is coupled to a counterbalancing weight. The feedback cylinder is hydraulically coupled to the boom stabilization cylinder. Movement of the boom stabilization cylinder to resist deflection of the boom causes corresponding movement of the feedback cylinder to lift the counterbalancing weight.

Another aspect of the present invention is seen in a boom assembly including a frame, a boom, a boom lift cylinder, and a boom stabilization cylinder. The boom is rotatably mounted to the frame to rotate about a first axis. The boom lift cylinder is mounted between the frame and the boom and operable to move the boom about a second axis to raise or lower the boom. The boom stabilization cylinder is coupled to the boom to resist rotational deflection of the boom about the first axis. The boom stabilization cylinder is hydraulically coupled to the boom lift cylinder. Movement of the boom stabilization cylinder to resist deflection of the boom causes corresponding movement of the boom lift cylinder to rotate the boom about the second axis.

Other objects, advantages and features of the present invention will become apparent from the following specification when taken in conjunction with the accompanying drawings.

BRIEF DESCRIPTION OF THE SEVERAL VIEWS OF THE DRAWINGS

The invention may be understood by reference to the following description taken in conjunction with the accompanying drawings, in which like reference numerals identify like elements and in which.

Figure 1:
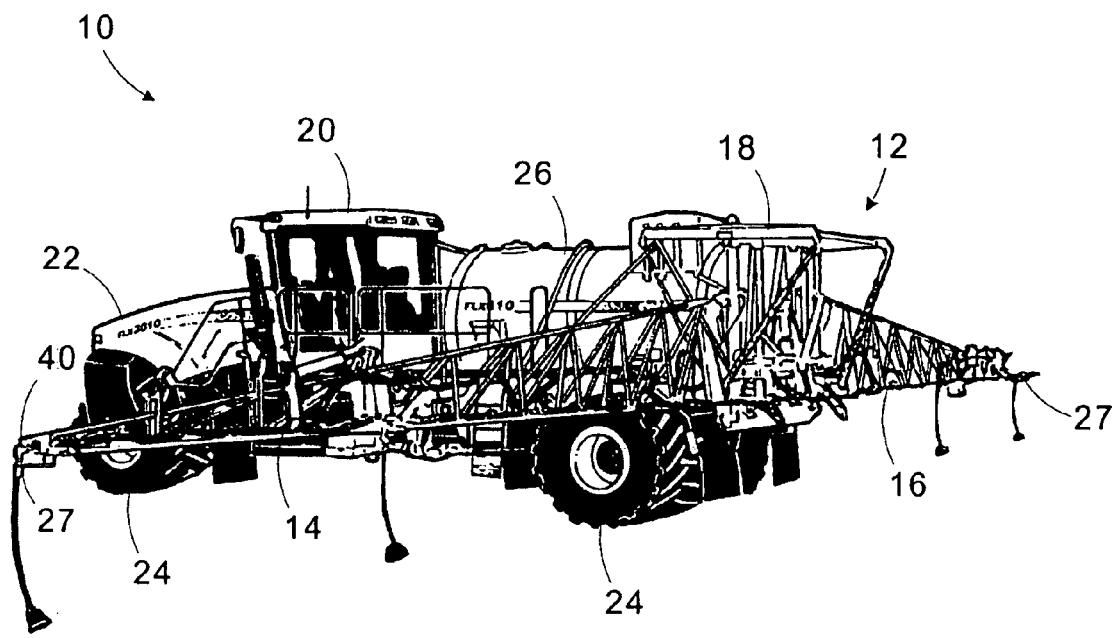
FIG. 1 is a perspective drawing of a sprayer in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

While the present invention may be embodied in any of several different forms, the present invention is described here with the understanding that the present disclosure is to be considered as setting forth an exemplification of the present invention that is not intended to limit the invention to the specific embodiment(s) illustrated. Nothing in this application is considered critical or essential to the present invention unless explicitly indicated as being "critical" or "essential."

Figure 2:
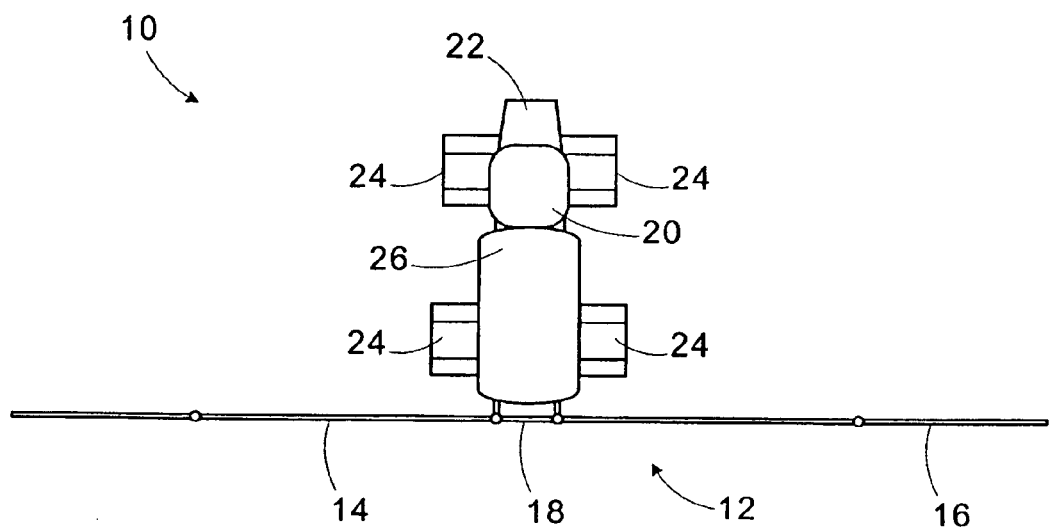
FIG. 2 is a top view of the sprayer of FIG. 1.

Referring now to the Figures, and most particularly to FIGS. 1 and 2, a sprayer 10 in accordance with one aspect of the present invention is illustrated. The sprayer 10 is capable of applying liquid chemicals to agricultural crops using a boom assembly 12 including one or two booms 14, 16 mounted to a frame 18, each of which may be extended perpendicularly to the sprayer 10 for spraying and each of which are retractable to a condition parallel to the sprayer 10 for transport. The sprayer 10 includes an operator's cab 20, an engine 22, and drive wheels 24. The sprayer 10 also includes a product tank 26 for carrying the chemicals to be applied via chemical delivery conduits and nozzles 27. In the illustrated embodiment, the drive vehicle is a FLX3010 offered by CNH America LLC.

Figure 3:
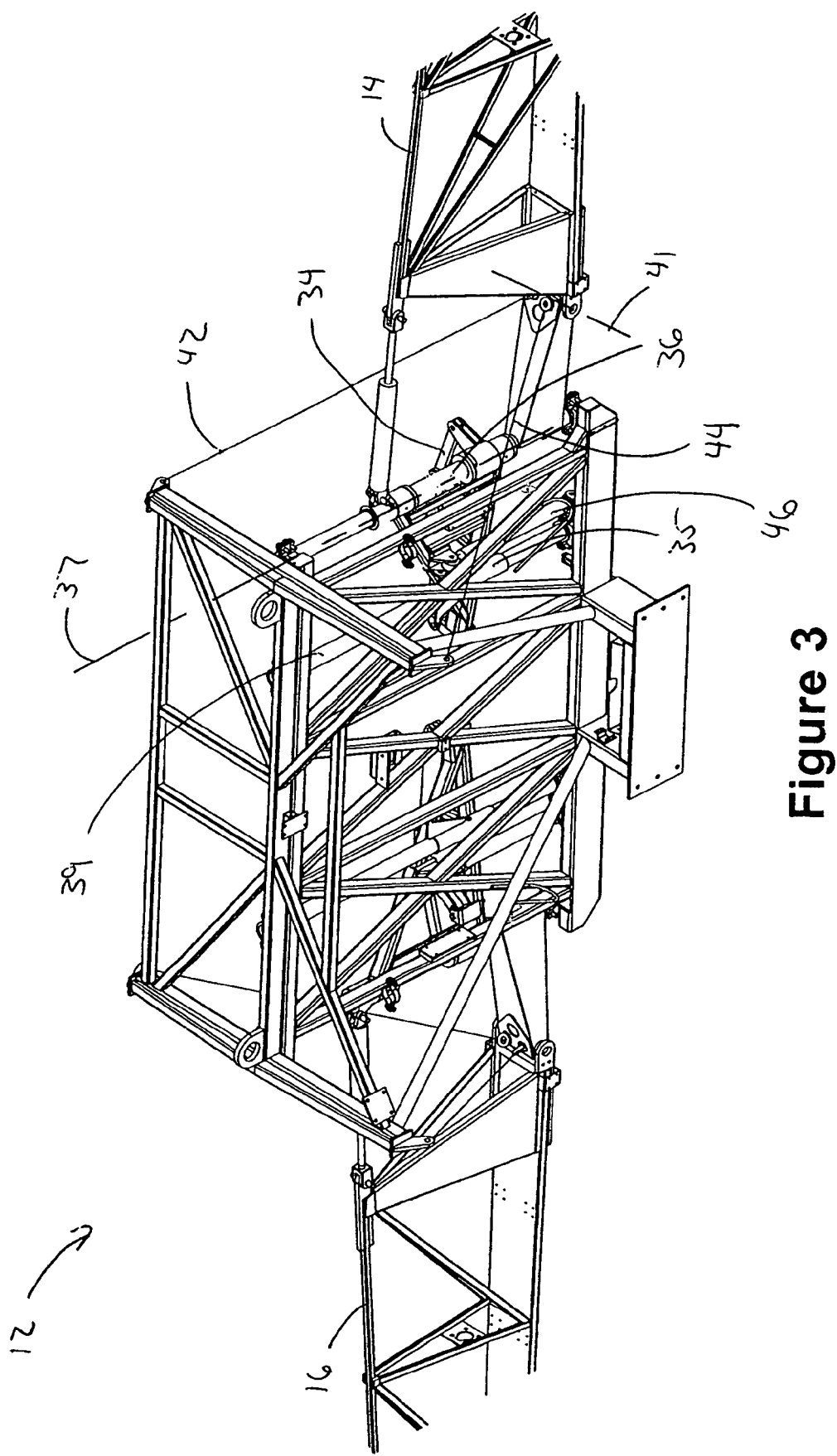
FIGS. 3–5 are front isometric, rear isometric, and rear views of a boom assembly used on the sprayer of FIG. 1, respectively.
Figure 4:
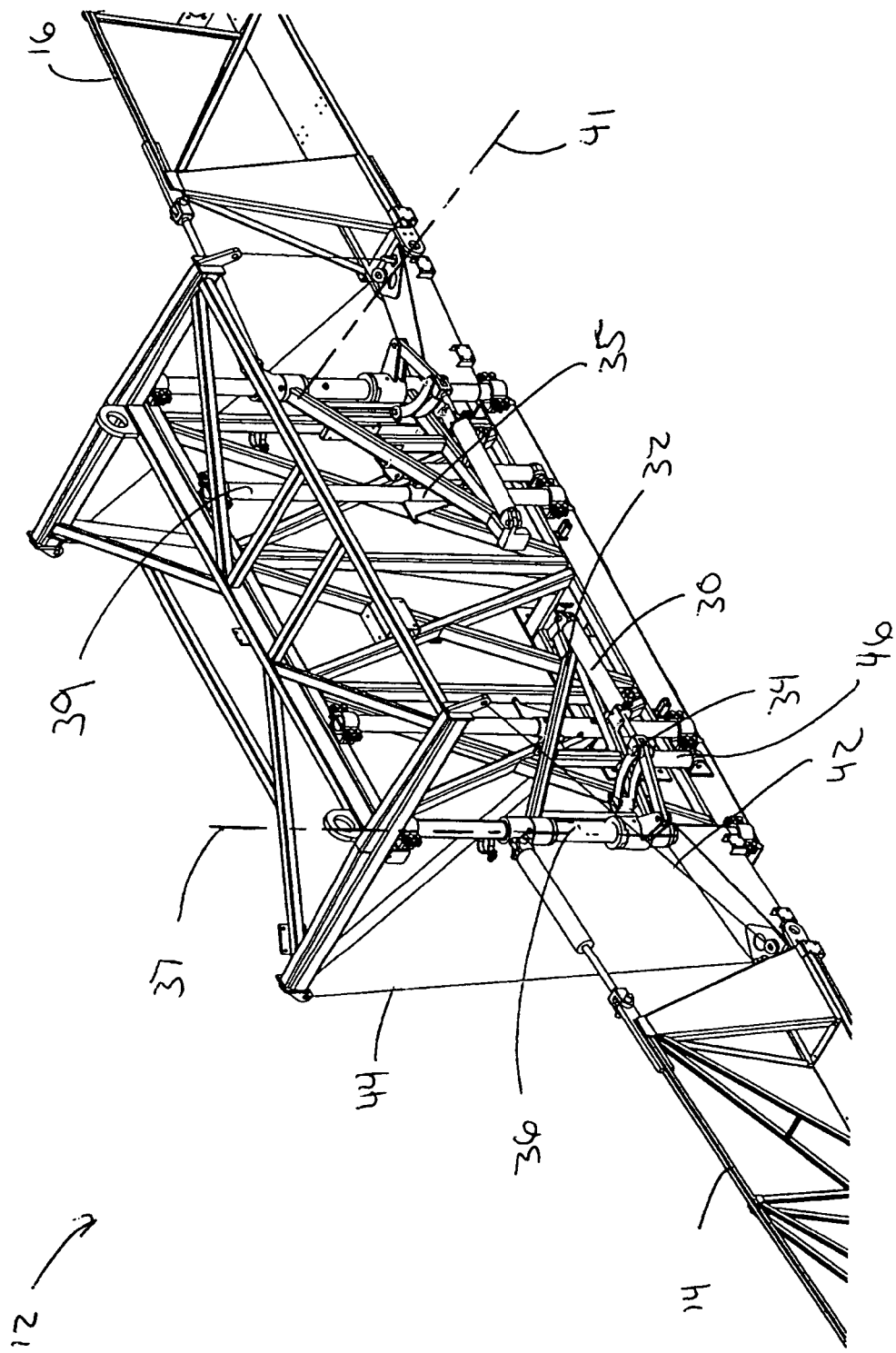
Figure 5:
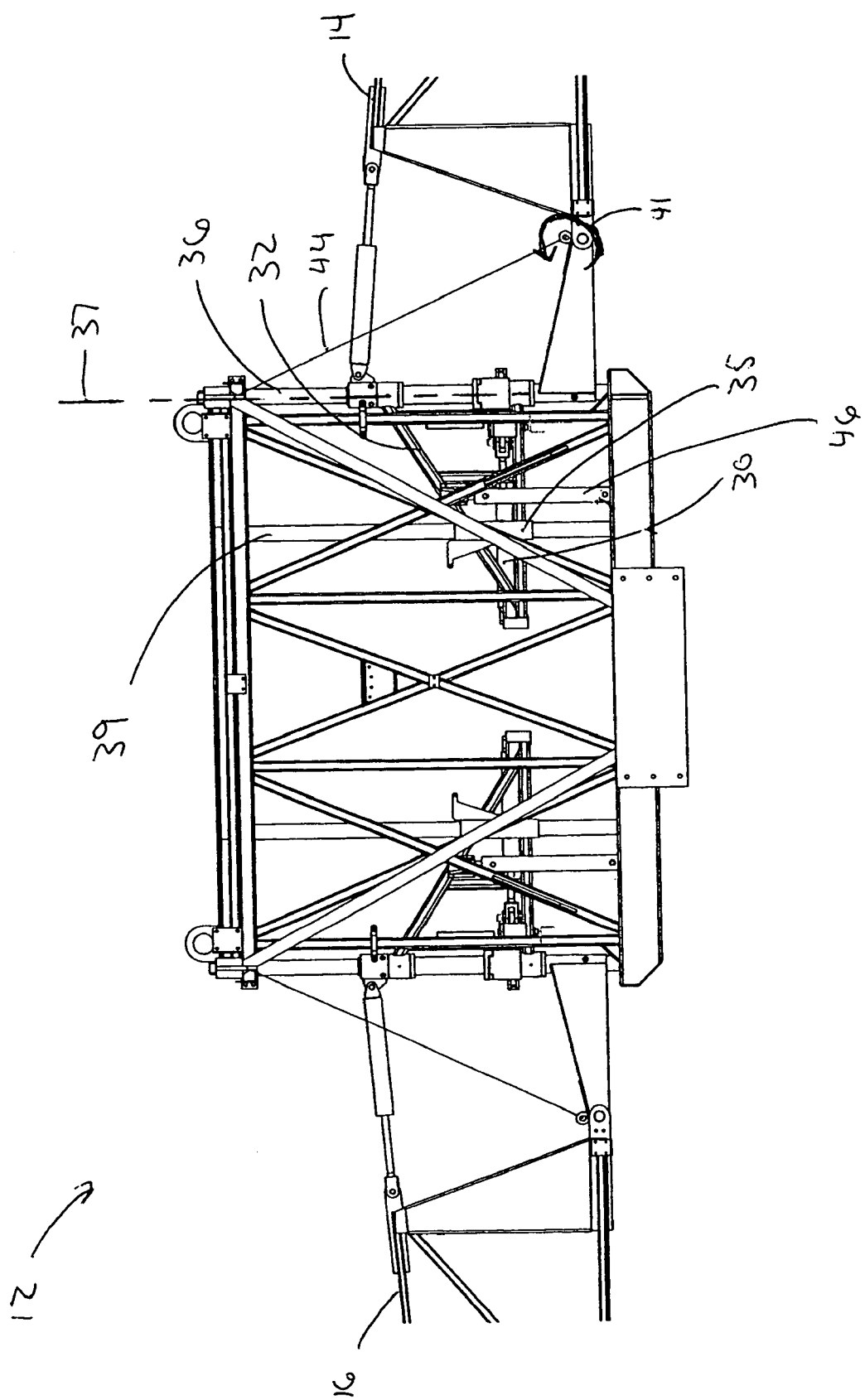

Turning now to FIGS. 3, 4, and 5, front isometric, rear isometric, and rear views of the boom assembly 12 are shown, respectively. As the booms 14, 16 and their respective control mechanisms are symmetric, the operation is described only in reference to the boom 14 and its associated components. Of course, the boom 16 will operate in a similar manner.

The present invention is not limited to any particular boom assembly 12 construction. Various techniques are known in the art for controlling the deployment and movement of the boom 14, and the particular arrangement shown here is provided for illustrative purposes.

In the illustrated embodiment, the deployment of the boom 14 from a storage position to an active position is affected by a boom fold cylinder 30 coupled to a swing :arm 32 and linkage 34. Movement of the boom fold cylinder 30 causes the boom 14 to rotate about a first slide pole 36 defining a first axis 37 to extend or retract the boom 14. The swing arm 32 is slidably mounted to the first slide pole 36, and by a sleeve 35 to a second slide pole 39. A boom lift cylinder 38 is provided for raising or lowering the tip 40 (shown in FIG. 1) of the boom 14 about a second axis 41 to allow maneuvering of the boom 14 to compensate for inclined surfaces and/or obstructions. Cables or chains 42, 44 center the boom 14 in the extended position by limiting the rotational movement thereof. If the boom 14 is deflected in the direction toward the front of the sprayer 10, the chain 42 becomes taut and prevents further rotational movement. The boom 14 is then restricted by the chain 42 and moves with the swing arm 32 up the slide poles 36, 39. Likewise, the chain 44 limits rearward deflection of the boom 14 and forces the boom 14 and swing arm 32 to move up the slide poles 36, 39 after the chain 44 becomes taut.

A stabilization cylinder 46 is provided to dampen the movement of the boom 14 and provide a feedback force to urge the boom 14 back to the equilibrium position (i.e., not deflected). In the illustrated embodiment, the stabilization cylinder 46 coupled between the frame 18 and the swing arm 32 to resist the movement of the boom 14 and swing arm 32 up the slide poles 36, 39. Although the stabilization cylinder 46 is illustrated as being configured to restrict the upward movement of the boom 14 resulting from the deflection thereof and the motion constraints imposed by the chain 42, it is contemplated that other arrangements may be used. For example, the stabilization cylinder 46 may be coupled to the boom 14 in a manner which directly resists rotational movement of the boom 14.

The stabilization cylinder 46 is hydraulically coupled to the boom lift cylinder 38, such that hydraulic fluid forced out of the stabilization cylinder 46 due to deflection of the boom, expressed as upward movement of the boom 14 along the slide pole 36, is provided to the boom lift cylinder 38 causing the tip 40 of the boom to be raised. As the force applied to the boom 14 causing its deflection is removed, the weight of the boom tip provided a counterbalancing force that urges the boom lift cylinder 38 back to its original position, thus forcing the hydraulic fluid that had been displaced back into the stabilization cylinder 46 to urge the boom 14 back down the slide pole 36 to its equilibrium position. Hence, the boom lift cylinder 38 acts as a feedback cylinder with an associated counterbalancing weight to counter the action of the stabilization cylinder 46 resulting form boom deflection thereby returning the boom 14 to its undeflected state. Although the feedback is generated by the boom lift cylinder 38 and the weight of the boom tip 40 in the illustrated embodiment, the application of the present invention is not so limited. For example a feedback cylinder may be directly mounted to a counterbalancing weight that serves no other function on the sprayer 10 except to counterbalance the movement of the stabilization cylinder 46. Employing the boom lift cylinder 38 in this manner obviates the need for such additional equipment.

Figure 6:
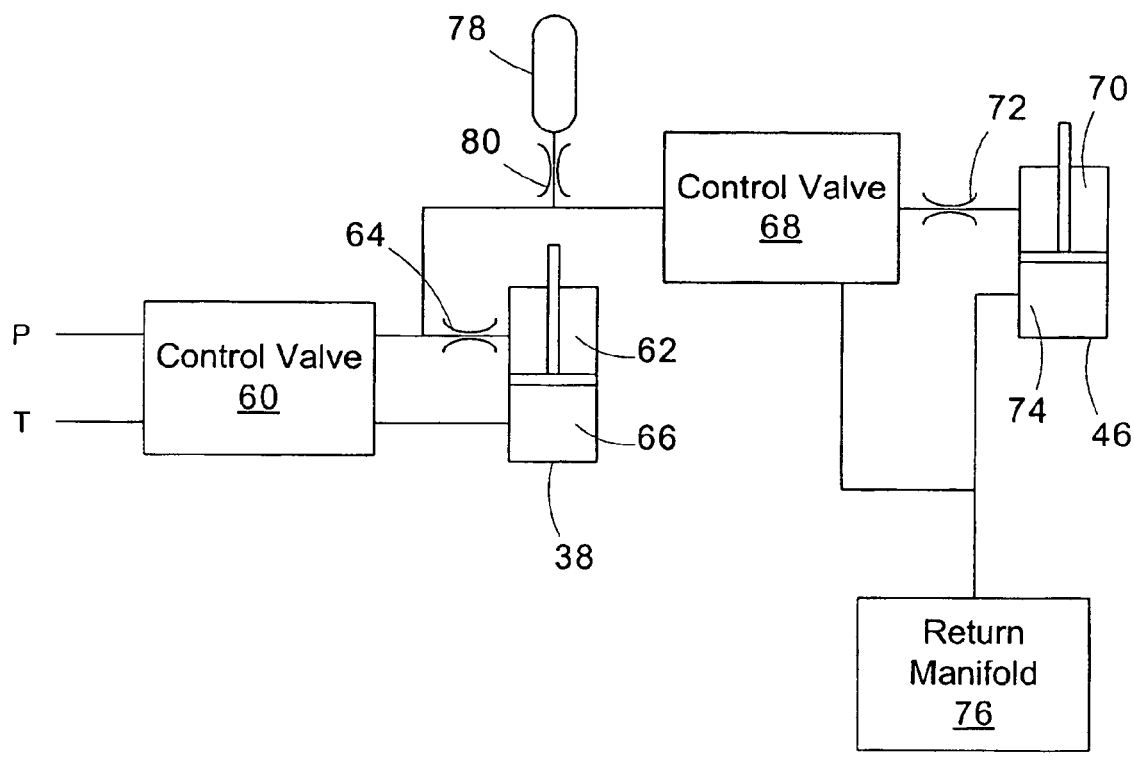
FIG. 6 is a hydraulic diagram of a boom stabilization system in accordance with another aspect of the present invention.

Referring now to FIG. 6, a hydraulic diagram of the boom stabilization system is provided. A control valve 60 controls the operation of the boom lift cylinder 38 to raise or lower the boom 14, as directed by the operator of the sprayer 10. Responsive to activation of the control valve 60 to raise the tip 40 of the boom 14, hydraulic fluid is provided from the inlet (i.e., designated by "P" for "pump") of the control valve 60 to the rod chamber 62 of the boom lift cylinder 38. An orifice 64 is provided between the control valve 60 and the rod chamber 62 to limit the velocity of the hydraulic fluid supplied and thereby control the rate of movement of the boom tip 40, as is well known in the art. Responsive to activation of the control valve 60 to lower the boom tip 40, hydraulic fluid is allowed to leave the piston chamber 66 of the boom lift cylinder 38 through the control valve 60 (i.e., designated by "T" for "tank").

Boom deflection in either direction causes the movement of the boom 14 and associated swing arm 32 up the slide poles 36, 39 and the activation of the stabilization cylinder 46. A control valve 68 is provided for enabling hydraulic communication between the stabilization cylinder 46 and the boom lift cylinder 38 during normal operation of the sprayer 10. The control valve 68 isolates the stabilization cylinder 46 from the boom lift cylinder 38 during deployment or retraction of the boom 14 (i.e., while the boom fold cylinder 30 is being operated.

Movement of the boom 14 up the slide pole 36 activates the stabilization cylinder 46 and moves the piston in the outward direction, thus forcing hydraulic fluid out of the rod chamber 70 and through an orifice 72. This displaced fluid then passes through the control valve 68 and into the rod chamber 62 of the boom lift cylinder 38, causing its piston to move inwardly and lift the boom tip 40.

When the force causing the displacement of the boom 14 is removed or reduced, the weight of the boom tip 40 exerts a force on the boom lift cylinder 38 that urges it toward its equilibrium state and forces the hydraulic oil back through the control valve 68 and into the rod chamber 70 of the stabilization cylinder 46. The weight of the boom 14 displaced by movement of the boom up the slide pole 36 and the feedback force provided by the boom lift cylinder 38 urge the boom 14 back to its equilibrium, undeflected state.

The piston chamber 74 of the stabilization cylinder 46 is coupled to the hydraulic return manifold 76 of the sprayer 10 to allow a supply of fluid during movement of the stabilization cylinder 46. The control valve 68 is coupled to the piston chamber 74 to allow hydraulic fluid to move between the piston chamber 74 and the rod chamber 70 during the active positioning of the boom 14 using the boom fold cylinder 30. An accumulator 78 is coupled through an orifice 80 to the line connecting the stabilization cylinder 46 and the boom lift cylinder 38 to avoid cavitating either cylinder during a period of rapid movement, as is well known in the art. The present invention may also be implemented without the accumulator 78.

The feedback provided by the boom lift cylinder 38 reduces oscillation and overshoot in the boom 14, as compared to a system that does not include the hydraulic communication between the boom lift cylinder 38 and the stabilization cylinder 46. Reduced boom 14 movement generally equates to better product coverage and reduced stress on the boom assembly 12.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A boom assembly, comprising:
   a frame;
   a boom rotatably mounted to the frame to rotate about a first axis;
   a boom stabilization cylinder coupled to the boom to resist rotational deflection of the boom about the first axis; and
   a feedback cylinder coupled to a counterbalancing weight, wherein the feedback cylinder is hydraulically coupled to the boom stabilization cylinder, and movement of the boom stabilization cylinder to resist deflection of the boom causes corresponding movement of the feedback cylinder to lift the counterbalancing weight.

2. The boom assembly of claim 1, wherein the frame comprises a slide pole, the boom being rotatably mounted to the slide pole.

3. The boom assembly of claim 2, further comprising linkage operable to convert rotational deflection of the boom about the first axis to vertical lifting of the boom along the slide pole.

4. The boom assembly of claim 3, wherein the linkage further comprises a cable coupled between the frame and the boom.

5. The boom assembly of claim 3, further comprising a swing arm coupled to the slide pole and the boom, wherein the linkage is operable to cause the swing arm to lift responsive to rotational deflection of the boom, and the stabilization cylinder is coupled between the frame and the swing arm to resist vertical movement of the swing arm.

6. The boom assembly of claim 1, wherein the feedback cylinder further comprises a boom lift cylinder coupled between the frame and the boom to move the boom about a second axis to raise or lower the boom, and the counterbalancing weight further comprises a weight component of the boom generated by the movement of the boom about the second axis.

7. The boom assembly of claim 1, wherein the boom stabilization cylinder has a first rod chamber and a first piston chamber, the feedback cylinder has a second rod chamber and a second piston chamber, and the rod chamber of the boom stabilization cylinder is coupled to the rod chamber of the feedback cylinder.

8. The boom assembly of claim 7, further comprising an accumulator coupled between the first rod chamber and the second rod chamber.

9. The boom assembly of claim 1, further comprising a control valve operable to isolate the boom stabilization cylinder from the feedback cylinder responsive to a control signal.

10. A boom assembly, comprising:
    a frame;
    a boom rotatably mounted to the frame to rotate about a first axis;
    a boom lift cylinder mounted between the frame and the boom and operable to move the boom about a second axis to raise or lower the boom; and
    a boom stabilization cylinder coupled to the boom to resist rotational deflection of the boom about the first axis; wherein the boom stabilization cylinder is hydraulically coupled to the boom lift cylinder, and movement of the boom stabilization cylinder to resist deflection of the boom causes corresponding movement of the boom lift cylinder to rotate the boom about the second axis.

11. The boom assembly of claim 10, wherein the frame comprises a slide pole, the boom being rotatably mounted to the slide pole.

12. The boom assembly of claim 11, further comprising linkage operable to convert rotational deflection of the boom about the first axis to vertical lifting of the boom along the slide pole.

13. The boom assembly of claim 12, wherein the linkage further comprises a cable coupled between the frame and the boom.

14. The boom assembly of claim 12, further comprising a swing arm coupled to the slide pole and the boom, wherein the linkage is operable to cause the swing arm to lift responsive to rotational deflection of the boom, and the stabilization cylinder is coupled between the frame and the swing arm to resist vertical movement of the swing arm.

15. The boom assembly of claim 10, wherein the boom stabilization cylinder has a first rod chamber and a first piston chamber, the boom lift cylinder has a second rod chamber and a second piston chamber, and the rod chamber of the boom stabilization cylinder is coupled to the rod chamber of the boom lift cylinder.

16. The boom assembly of claim 15, further comprising an accumulator coupled between the first rod chamber and the second rod chamber.

17. The boom assembly of claim 10, further comprising:
    a first control valve operable control the boom lift cylinder to move the boom about the second axis to raise or lower the boom; and
    a second control valve operable to isolate the boom stabilization cylinder from the boom lift cylinder responsive to a control signal.

* * * * *